United States Patent [19]
Olds et al.

[11] Patent Number: 6,078,810
[45] Date of Patent: *Jun. 20, 2000

[54] MULTIPLE-TIER SATELITE COMMUNICATION SYSTEM AND METHOD OF OPERATION THEREOF

[75] Inventors: Keith Andrew Olds, Mesa; James Thomas Shaneyfelt, Gilbert; John Richard Kane, Phoenix; Carl Myron Wagner, Higley, all of Ariz.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/873,551

[22] Filed: Jun. 12, 1997

[51] Int. Cl.[7] .................................................. H04Q 7/20
[52] U.S. Cl. ...................... 455/428; 455/12.1; 455/13.1; 455/430; 455/25
[58] Field of Search ................................. 455/12.1, 13.1, 455/427, 428, 429, 430, 13.2, 25, 13.3, 31.3, 19; 244/158 R

[56] References Cited

U.S. PATENT DOCUMENTS

| | | | |
|---|---|---|---|
| 5,471,641 | 11/1995 | Dosiere et al. | 455/13.1 |
| 5,574,969 | 11/1996 | Olds et al. | 455/429 |
| 5,666,648 | 9/1997 | Stuart | 455/13.1 |
| 5,699,355 | 12/1997 | Natarajan | 370/322 |
| 5,699,369 | 12/1997 | Guha | 371/41 |
| 5,722,042 | 2/1998 | Kimura et al. | 455/13.1 |

FOREIGN PATENT DOCUMENTS

| | | | |
|---|---|---|---|
| 0325429 | 1/1989 | European Pat. Off. | H04B 9/00 |
| 3254292 | 1/1989 | European Pat. Off. | H04B 9/00 |
| 7073892 | 9/1995 | European Pat. Off. | H04B 7/185 |
| 0707389 | 4/1996 | European Pat. Off. | H04B 7/185 |
| 7675472 | 9/1996 | European Pat. Off. | H04B 7/195 |
| 0767547 | 4/1997 | European Pat. Off. | H04B 7/195 |
| 9513671 | 11/1994 | WIPO | H04B 7/195 |
| 9513671 | 5/1995 | WIPO | H04B 7/195 |
| 9535602 | 6/1995 | WIPO | H04B 1/19 |
| 9536502 | 12/1995 | WIPO | H04B 7/195 |

*Primary Examiner*—Daniel S. Hunter
*Assistant Examiner*—Yemane Woldetatios
*Attorney, Agent, or Firm*—Sherry J. Whitney; Frank J. Bogacz; Jennifer B. Wuamett

[57] ABSTRACT

A method and apparatus have been described for combining multiple satellite constellations into a cooperative network. A GEO tier of satellites receives information to be broadcasted to earth. The GEO tier receives the information from global hubs, regional hubs, and local hubs. Local program material is combined with regional and global program material by either the regional hub or a GEO satellite.

13 Claims, 6 Drawing Sheets

MULTIPLE-TIER SATELITE COMMUNICATION SYSTEM AND METHOD OF OPERATION THEREOF

FIELD OF THE INVENTION

The present invention relates generally to satellite communication systems and methods, and more particularly to satellite communication systems and methods employing non-geostationary satellites.

BACKGROUND OF THE INVENTION

The global media distribution community is concerned that the lack of local program material is a substantial weakness in its market offerings.

The demand for broadband services is expected to grow dramatically in the next few years, imposing new requirements for higher data rate links. Terrestrial broadband networks are expected to utilize OC-3 rates more frequently due to advances in electronics and switching architectures. A natural extension to these terrestrial networks, via a satellite network, would require a flexible allocation of several of these higher data rate links, within a single satellite footprint.

What is needed is a method and apparatus for efficiently combining global broadcast services with local broadcast services. What is also needed is an inexpensive method and apparatus for providing bandwidth-on-demand services.

DETAILED DESCRIPTION OF THE DRAWINGS

Figure 1:
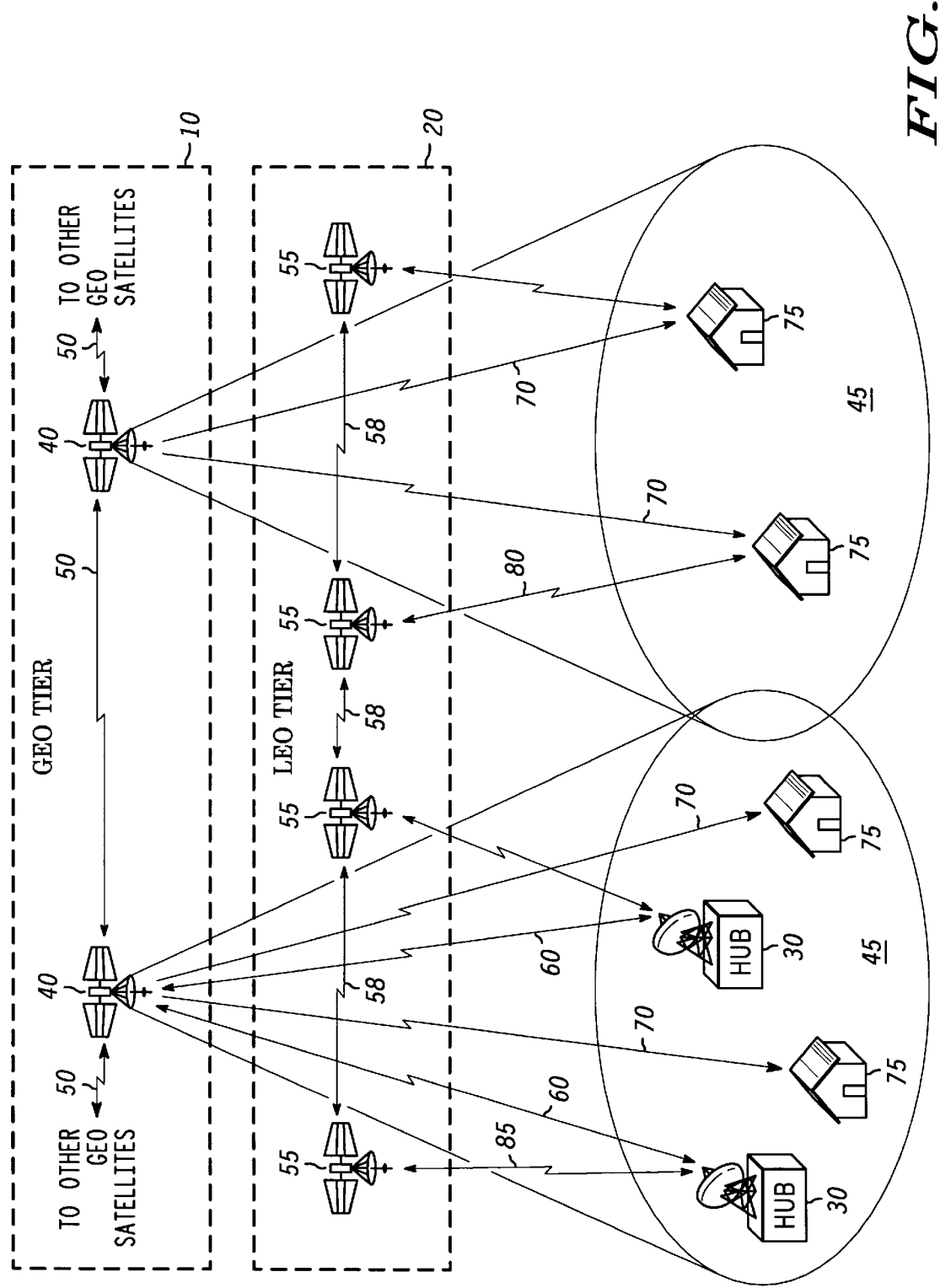
FIG. 1 illustrates a two-tier satellite system in accordance with a preferred embodiment of the present invention.

The method and apparatus of the present invention utilizes a space based high speed data network to enable global connectivity and to provide broadband data transport services to users and to private and public data networks. It enables global and regional communication service providers to deploy and enhance data transport services, improve network availability relative to terrestrial services, and extend the reach of their services into areas that cannot be economically served by terrestrial means.

The method and apparatus of the present invention provides broadband transport and global connectivity for applications such as video conferencing, telecommuting, multimedia information retrieval (e.g., from Internet World Wide Web servers), remote education and training, video and audio distribution, software distribution, advertising, news, medical collaboration using high resolution images, video conferencing, interactive multimedia, and subnetwork interconnections.

An important advantage of the system is that it can be seamlessly interfaced into existing networks and communications infrastructure. This interface capability and many of the applications expected to use the method and apparatus of the present invention require high data rate transmission with low transit delays.

Accordingly, in a preferred embodiment, the system concept is based on multi-tier satellite network which includes a Low Earth Orbit (LEO) constellation of satellites and a Geostationary Earth Orbit (GEO) constellation of satellites, where the satellites within the constellations are interconnected to form a network that provides global access, broadcast and multicast capabilities, very high capacity, and high data rate transmission with minimal transit delay. An alternate embodiment includes a Medium Earth Orbit (MEO) constellation of satellites in conjunction with a GEO constellation.

Other alternate embodiments of the method and apparatus of the present invention utilize systems having three or more tiers of satellite networks. For example, an embodiment is described below having two distinct LEO network tiers operating in conjunction with a GEO network.

Section 1—SYSTEM ARCHITECTURE

In a preferred embodiment of the present invention, a two-tier satellite system includes a GEO satellite tier and a LEO satellite tier. Ground-based "hub" stations uplink to the GEO satellite tier which has an inter-satellite link (ISL) backbone. GEO satellites downlink information in a broadcast or multi-cast mode to Customer Premise Equipment (CPEs) which otherwise communicate with each other (or the hubs) via the LEO satellite tier. This preferred embodiment is described in detail, below, in sub-section 1.A.

A first alternate embodiment of the two-tier satellite system includes "regional hubs" and "local hubs" which communicate with the GEO satellite tier. These hubs act as relays back to the regional GEOs from which the program material is rebroadcast. This first alternate embodiment is described in detail, below, in sub-section 1.B.

A second alternate embodiment of the two-tier satellite system utilizes the LEO satellite tier for broadcast distribution to regional hubs. The regional hubs then uplink to a regional GEO for regional downlink broadcasting. This second alternate embodiment is described in detail, below, in sub-section 1.C.

The preferred embodiment and the first and second alternate embodiments do not utilize ISLs between LEO satellites and GEO satellites. However, other alternate embodiments are envisioned where the preferred, and the first and second alternate embodiments could be modified to incorporate LEO-to-GEO and GEO-to-LEO ISLs.

1.A Preferred Embodiment—Global Hub

FIG. 1 illustrates a two-tier satellite system in accordance with a preferred embodiment of the present invention The two-tier satellite system includes a GEO tier 10 of satellites, a LEO tier 20 of satellites, and at least one global hub 30 (Ghub). Preferred embodiments for GEO tier 10 and LEO tier 20 are described in detail in sections 3.A and 3.B, respectively. In a preferred embodiment, GEO satellites 40 within GEO tier 10 communicate with each other over GEO ISLs 50. In a preferred embodiment, GEO ISLs 50 are optical cross-links, although radio-frequency (RF) links also could be employed.

Due to the relatively stationary nature of a GEO satellite, each GEO satellite 40 services a particular geographic area, or broadcast region 45. One or more of the GEO satellites 40 communicate with one or more global hubs 30 in these regions over Ghub-to-GEO links 60. In a preferred embodiment, Ghub-to-GEO links 60 are RF links, although optical links also could be employed. RF links would be desirable for high system reliability in areas having obstacles or weather patterns not conducive to optical transmissions. In a preferred embodiment, hub-to-GEO links 60 are Ka-band RF links.

A global hub is defined herein as a hub which is a source of a significant amount of information to be retransmitted by the GEO tier 10. Global hubs generally are earth stations that aggregate information from other sources outside the system and relay it to the GEO tier 10. Signals to be retransmitted by the GEO tier 10 include, among other things, broadcast signals and multi-cast signals. GEO satellites 40 broadcast signals over GEO downlinks 70 within broadcast areas 45 to Customer Premise Equipment (CPE) 75. Broadcast signals can be, for example, radio and television. In a preferred embodiment, GEO satellites 40 are also capable of sending multi-cast signals. Multi-cast signals include signals that are addressed to specific users or specific sets of users, so that not all of the CPEs in a broadcast area 45 will receive the signal. Multi-cast signals can contain, for example, publishing or business information.

In a preferred embodiment, all network traffic emanates from a single, global hub located within one beam of a GEO satellite 40. This GEO satellite is termed the "Source GEO Satellite." The network traffic is distributed through GEO ISLs interconnecting the source GEO satellite with the regional GEO satellites. Material intended for broadcast within a particular region is stripped from the ISL backbone signal and broadcast on GEO downlinks 70 to CPEs 75. In a preferred embodiment, downlinks 70 are RF downlinks.

One or more global hubs can exist, possibly within one or more broadcast areas 45, depending on the number and location of program material sources. Ghub-to-GEO links 60 can be assumed to be quite heavily loaded since all the programming material for global distribution might be contained on a single link. It is possible that more than one GEO satellite 40 might be required to operate as a source GEO satellite in order to handle very heavy uplinking. In a preferred embodiment, a global hub 30 transmits time-zone phased replicas of each bundle of network services for distribution over GEO ISLs 50 to each of the regional areas.

In a preferred embodiment, global hub 30 is capable of interoperating with both GEO satellites 40 and LEO satellites 55. Global hub 30 controls service provision from the satellites to the CPEs 75. Thus, when a CPE 75 solicits service from global hub 30 via LEO satellites 55, global hub 30 grants or denies the service. If the service is granted, global hub 30 controls GEO satellites 40 and/or LEO satellites 55 to provide the requested service to the requesting CPE. Which satellite tier provides the service depends on the type of service requested. For example, if CPE 75 requested a bi-directional communication channel to be established with another CPE, global hub 30 would determine that LEO satellites 55 were best suited to provide the service. On the other hand, if a CPE 75 requested a message to be broadcast, global hub 30 would determine that GEO satellites 40 were best suited to provide the service.

LEO satellites 55 within LEO tier 20 communicate with each other over LEO ISLs 58. In a preferred embodiment, LEO ISLs 58 are RF cross-links, although optical links also could be employed.

LEO satellites 55 communicate with CPEs 75 over CPE-to-LEO links 80. LEO satellites 55 also communicate with global hubs 30 over hub-to-LEO links 85. In a preferred embodiment, CPE-to-LEO links 80 and hub-to-LEO links 85 are RF cross-links, although optical links also could be employed.

Because LEO satellites 55 support LEO ISLs 58, CPE-to-LEO links 80, and hub-to-LEO links 85, the tier of LEO satellites 55 can convey information from CPEs 75 to global hubs 30, and vice versa. In a preferred embodiment, all nonbroadcast linking among CPEs 75, and linking between CPEs 75 and global hubs 30 are handled by the LEO tier 20. Links between CPEs 75 and global hubs 30 can be unidirectional or interactive.

The GEO and LEO satellite tiers represent two relatively isolated space segments. Thus, there is no particular need for GEO and LEO satellites to have substantially compatible equipment. In a preferred embodiment, however, GEO satellites 40 and LEO satellites 55 are designed in such a way as to allow substantially the same satellite bus to be used for both types of satellites. Utilizing the same satellite bus for both LEO and GEO satellites significantly reduces cost and production time, both of which are very desirable.

1.B First Alternate Embodiment—Regional and Local Hubs

Figure 2:
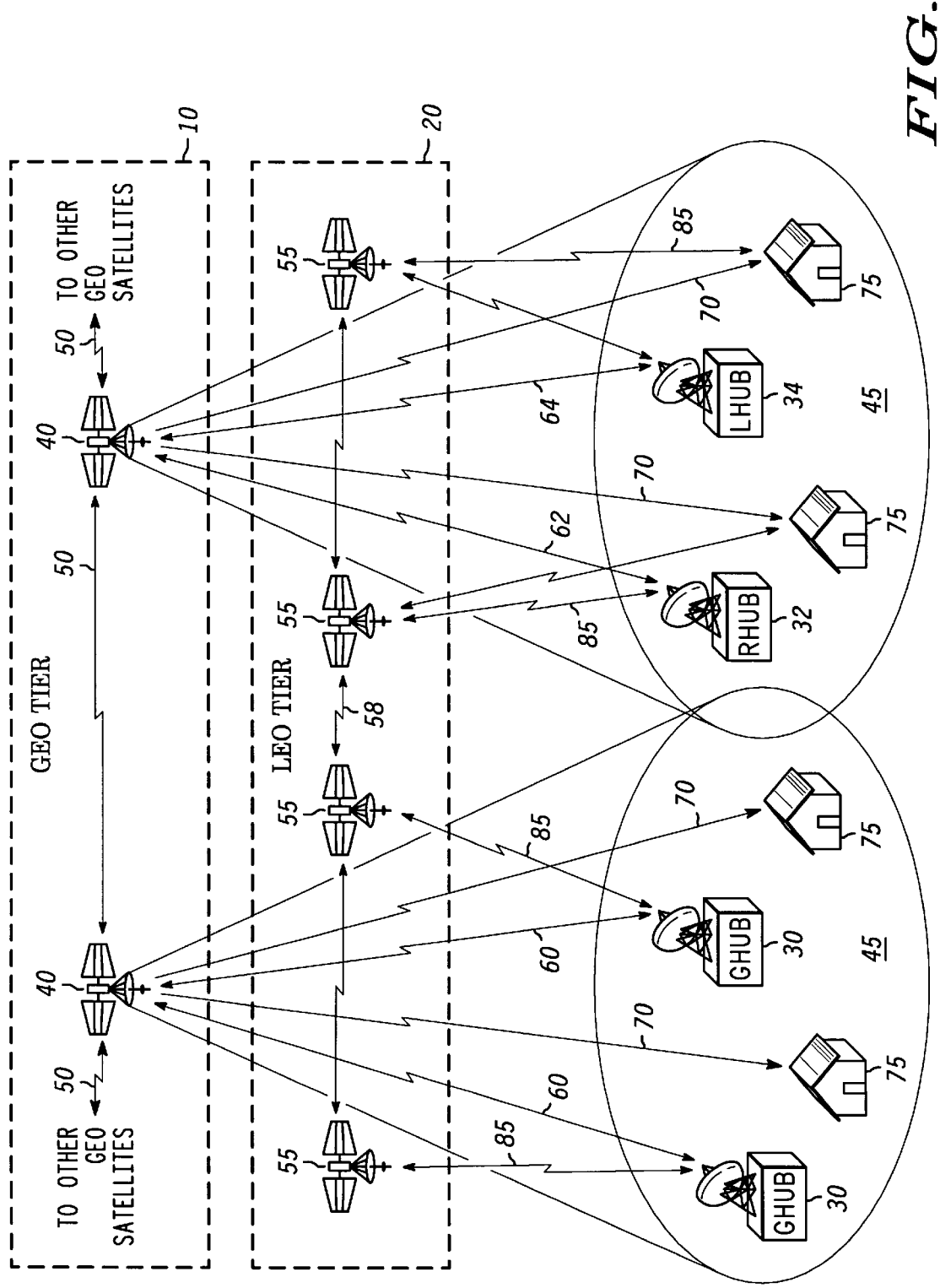
FIG. 2 illustrates a two-tier satellite system in accordance with a first alternate embodiment of the present invention.

FIG. 2 illustrates a two-tier satellite system in accordance with a first alternate embodiment of the present invention.

The two-tier satellite system shown in FIG. 2 is similar to the system described in conjunction with FIG. 1 in that it includes a GEO tier 10 of satellites and a LEO tier 20 of satellites. The first alternate embodiment, however, includes global hubs 30 (GHub), regional hubs 32 (RHub), and local hubs 34 (LHub). Global hubs 30 communicate with GEO satellites 40 over GHub-to-GEO links 60. Similarly, regional hubs 32 communicate with GEO satellites 40 over RHub-to-GEO links 62 and local hubs 34 communicate with GEO satellites 40 over LHub-to-GEO links 64.

Regional hubs 32 provide an advantage in that the system can provide regional program material to complement the global material supplied by global hubs 30. In addition, the method and apparatus of the first alternate embodiment allows regional hubs 32 to store-and-forward global material so that it can be delivered locally at a convenient time. This allows a global hub to send one version of the global material, rather than multiple versions on a per-region time-zone basis as discussed in conjunction with FIG. 1. Further, this substantially reduces the uplink loading for the GHub-to-GEO links 60.

The system described in conjunction with FIG. 2 is capable of permitting regional hubs 32 also to receive local program material from local hubs 34 (via LHub-to-GEO links 64 and RHub-to-GEO links 62). Regional hubs 32 can perform switching between global, regional, and local program material. Or alternatively, regional hubs 32 and local hubs 34 can uplink regional and local program information to a regional GEO satellite which performs switching. Performing the switching function in the GEO satellite 40 alleviates some processing requirements in the regional hub 32, but increases the processing required in the GEO satellite 40.

Thus, unlike prior-art systems, the method and apparatus of the first alternate embodiment enables subscriber equipment (e.g., CPEs 75) to receive global, regional, and local program material, rather than receiving only global material.

This is a very advantageous outcome of the present invention. Global media providers desire to serve regional and local markets with targeted program materials, and the present invention provides a solution.

CPEs 75 can interact via the LEO satellites 55 with global hubs 30, regional hubs 32, local hubs 34, and/or other CPEs 75.

In one embodiment, GEO satellites 40 incorporated into the system of the first alternate embodiment are capable of: 1) supplying a connection between a local hub 34 and a regional hub 32 via LHub-to-GEO links 64 and RHub-to-GEO links 62); 2) stripping off material received on a GEO ISL 50 which is intended for broadcast within a particular region; 3) uplinking from a regional hub 62; and 4) broadcasting on GEO downlinks 70 to CPEs 75.

In an alternate embodiment, a system could include global hubs 30 and regional hubs 32, but not local hubs 34. Many of the alternate embodiments discussed in conjunction with the system described in conjunction with FIG. 1 also apply to the first alternate embodiment described in conjunction with FIG. 2. In addition, many of the functions allocated to the global hubs in the preferred embodiment of FIG. 1 can now be dispersed across the collection of global hubs 30, regional hubs 32, and local hubs 34 of the alternate embodiment described in conjunction with FIG. 2. For instance, when a CPE requests a service, the service request may be routed to a local hub 34 or regional hub 32 rather than to a global hub 30.

1.C Second Alternate Embodiment—LEO Distribution to Regional Hubs

Figure 3:
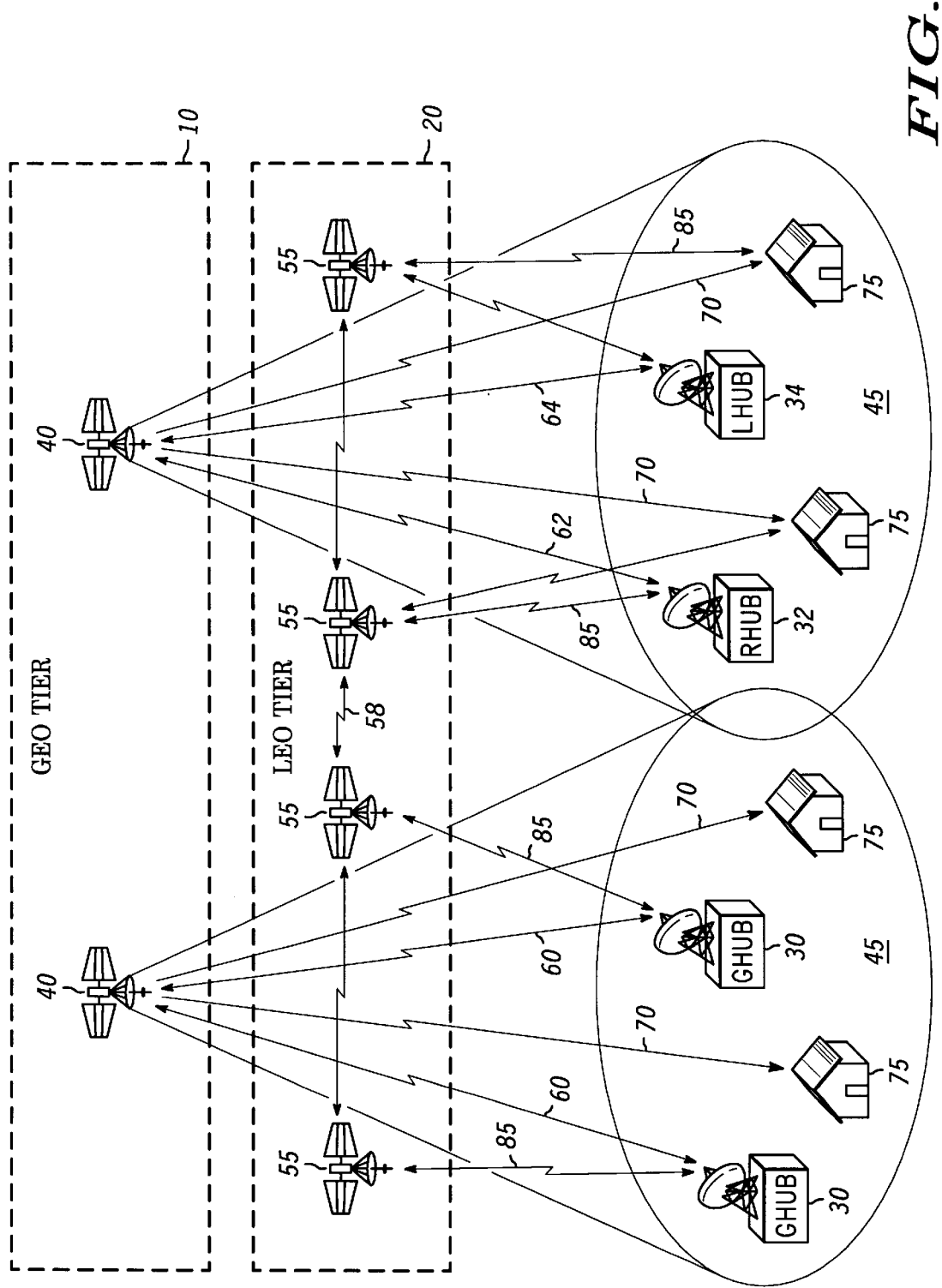
FIG. 3 illustrates a two-tier satellite system in accordance with a second alternate embodiment of the present invention.

FIG. 3 illustrates a two-tier satellite system in accordance with a second alternate embodiment of the present invention.

The two-tier satellite system shown in FIG. 3 is similar to the system described in conjunction with FIG. 2 in that it includes a GEO tier 10 of satellites, a LEO tier 20 of satellites, global hubs 30, regional hubs 32, and local hubs 34. Similarities also exist in the way that the regional hubs store and forward information to alleviate the need for the global hubs to simultaneously transmit information for multiple time zones.

Also similar to the system described in conjunction with FIG. 2, the system described in conjunction with FIG. 3 is capable of permitting regional hubs 32 to receive local program material from local hubs 34 (via LHub-to-GEO links 64 and RHub-to-GEO links 62). Regional hubs 32 can perform switching between global, regional, and local program material. Or alternatively, regional hubs 32 and local hubs 34 can uplink regional and local program information to a regional GEO satellite which performs switching. Performing the switching function in the GEO satellite 40 alleviates some processing requirements in the regional hub 32, but increases the processing required in the GEO satellite 40.

However, in contrast to the previously described embodiments, in the alternate embodiment depicted in FIG. 3, LEO satellites 55 (rather than GEO satellites 40) are used to receive and distribute material to regional hubs 32 via LEO ISLs 58 and LEO-to-hub links 85. Thus, no GEO ISLs (see ISL 50, FIG. 2) are necessary in the second alternate embodiment depicted in FIG. 3. Also in contrast to previously described embodiments, in the alternate embodiment of FIG. 3, the switching between global, regional, and local program material is done in the regional GEO satellite.

In an alternate embodiment, a system could include global hubs 30 and regional hubs 32, but not local hubs 34. Many of the alternate embodiments discussed in conjunction with the system described in conjunction with FIGS. 1 and 2 also apply to the second alternate embodiment described in conjunction with FIG. 3.

Section 2—MULTI (>3) TIER ALTERNATE EMBODIMENT

The preferred embodiment and the first and second alternate embodiments described in sub-sections 1.A through 1.C describe a two-tier satellite system having a GEO tier and a LEO tier. In an alternate embodiment, the two-tier satellite system could have a GEO tier and a MEO tier. Alternatively, a system could have a MEO tier and a LEO tier. Some of the important concepts of the present invention relate to the fact that more than one satellite tier exists within the system. Although a GEO and LEO satellite tier combination is preferable, many of the advantages of the method and apparatus of the present invention could be gained using other combinations of satellite tiers.

In other alternate embodiments, more than two satellite tiers could be included within a system. Subsections 2.A and 2.B, below, discuss satellite networks having three tiers. Subsection 2.C discusses a network with three virtual tiers, but 2 physical tiers.

2.A GEO Tier with Two LEO Tiers

Figure 4:
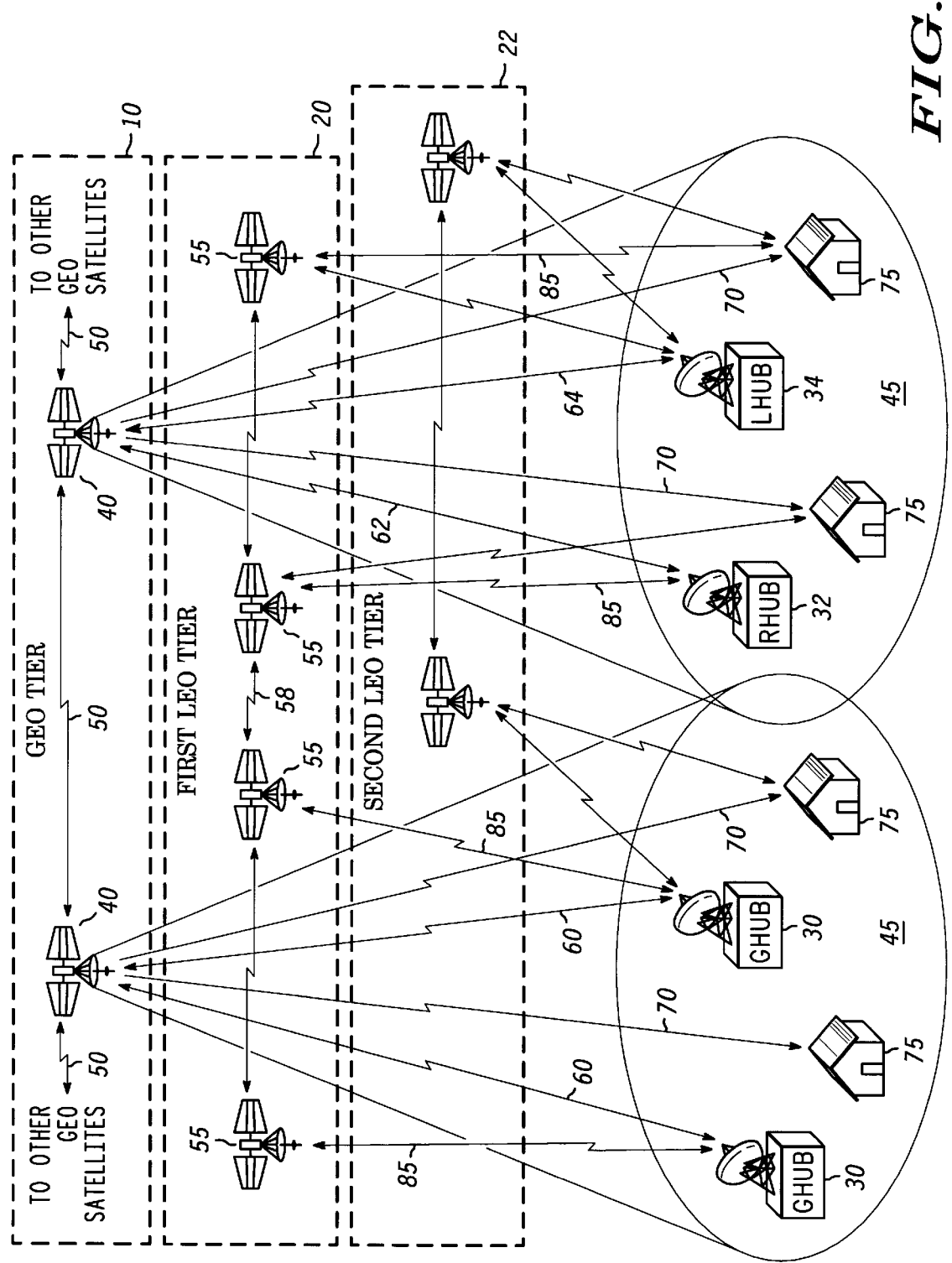
FIG. 4 illustrates a three-tier satellite system in accordance with an alternate embodiment of the present invention.

FIG. 4 illustrates a three-tier satellite system in accordance with an alternate embodiment of the present invention. The three tier system is similar to the system described in conjunction with FIG. 1 and can have other alternate embodiments similar to those described in conjunction with FIGS. 2 and 3. However, the three tier embodiment includes a tier of GEO satellites and two tiers of LEO satellites. In other words, the system has an additional tier of LEO satellites. Preferred embodiments for the tier of GEO satellites, the first tier of LEO satellites, and the second tier of LEO satellites are described in detail in sections 3.A, 3.B, and 3.C, respectively.

An additional tier of LEO satellites is desirable in order to provide additional services to CPEs 75. As explained in more detail in sub-sections 3.B and 3.C, a first LEO tier can provide point-to-point satellite services between two CPEs 75, between a CPE and hub, or between a CPE and a gateway (i.e., a facility for interfacing a satellite network with a terrestrial network such as a PSTN or terrestrial cellular network). A second LEO tier can provide, for example, inter- and intra-system data links for wireless networks, among other things.

Additionally, the first LEO tier can provide switched bandwidth-on-demand services and the second LEO tier can provide provisioned bandwidth services. The interoperation of the two LEO tiers is accomplished in a number of ways. One method of interoperation is for the first LEO tier to aggregate a number of high data rate bandwidth-on-demand users, and then for the second LEO tier to backhaul the aggregate high bandwidth signal around the world, returning it back to the first LEO tier to be disseminated.

2.B GEO Tier with MEO Tier and LEO Tier

Another alternate embodiment of the method and apparatus of the present invention is similar to the three tier embodiment just described, except that the system includes a tier of GEO satellites, a tier of LEO satellites, and a tier of MEO satellites (rather than a second tier of LEO satellites).

2.C GEO Tier with Multi-Function LEO Tier

Another alternate embodiment of the method and apparatus of the present invention is similar to the three tier embodiment described in section 2.A, except that the system includes a tier of GEO satellites and a single tier of LEO satellites, where the tier of LEO satellites has multiple capabilities. For example, rather than having a first LEO tier which provides point-to-point satellite services between CPEs, hubs, and gateways, and a second LEO tier which provides inter- and intra-system data links for wireless networks, a single LEO tier could provide all functions provided by the first and second LEO tiers.

Alternately, a single LEO tier could provide switched bandwidth-on-demand services as well as wideband provisioned services.

The single LEO tier would appear as two virtual LEO tiers. Each LEO satellite could be capable of performing both types of functions. Alternatively, certain satellites in the LEO tier could be designated to perform the first function while other satellites could be designated to perform the second function.

The alternate embodiments described in sub-sections 2.A through 2.C describe three-tier satellite systems (actual or virtual). In alternate embodiments, more than three satellite tiers could be included in a system. In addition, many of the advantages of the method and apparatus of the present invention could be gained using other combinations of satellite tiers.

Section 3—DESCRIPTION OF SATELLITE TIERS

In order to facilitate a complete understanding of the method and apparatus of the present invention, preferred embodiments for the GEO and LEO satellite tiers of the preferred embodiment are described, below, in sub-sections 3.A and 3.B. In addition, an embodiment of a second LEO satellite tier is described, below, in sub-section 3.C for the alternate embodiments described in section 2, above.

3.A GEO Tier

In a preferred embodiment, the method and apparatus of the present invention provides a GEO satellite constellation that provides broadcast services, preferably at a local level. Three GEO satellites are needed to cover the world, and the system of the present invention preferably has at least 6.

Each GEO satellite has multiple unidirectional beams for broadcasting information to the ground. Preferably, the GEO satellites of the present invention have about 500 beams each. This allows geographically localized areas to be addressed separately. When global information is being broadcast, local information can be interspersed so that users on the ground receive information pertinent to their local area.

In a preferred embodiment, the satellites in the GEO tier have ISLS. Each GEO satellite preferably has two links, one to each adjacent satellite. The GEO ISLs are preferably optical, but can also be implemented as RF links.

3.B First LEO Tier

In a preferred embodiment, the method and apparatus of the present invention provides a first Low Earth Orbiting (LEO) satellite constellation that provides high data rate transmission with low transit delays over the populated areas of the Earth's surface. In a preferred embodiment, the system provides satellite services with a variety of user data rates to small, very small, and ultra-small satellite earth terminals. It also provides high data rate connections to gateway earth terminals that interface to the public switched telephone network (PSTN).

The first LEO tier provides bandwidth on demand. When CPEs request service, they are connected to the first LEO tier and bandwidth is dynamically allocated for the communications task required. The LEO satellites in the first tier continually respond to the demands of different CPEs, and so perform a significant amount of switching. The first tier, therefore, provides bandwidth on demand services, but does so at the expense of switching overhead.

Examples of services that benefit from bandwidth-on-demand are internet usage and videoconferencing. These services tend to be bandwidth intensive, yet short in duration.

The constellation design for the first LEO tier consists of 63 satellites flying in planes of 9 equally-spaced satellites in 7 planar orbits. The satellites form a constellation that provides coverage over 99% of the populated earth's surface.

A LEO constellation has been selected for this tier to ensure that the delays experienced by end-users are essentially equivalent to domestic transport systems for global real-time services. The system has been designed to be compatible with the existing global terrestrial infrastructure and communication standards. Thus, the system will seamlessly integrate with existing networks and provide a quality of service similar to that achieved by terrestrial fiber optic based networks.

3.C Second LEO Tier

In a preferred embodiment, the method and apparatus of the present invention provides a second Low Earth Orbiting (LEO) satellite constellation that provides high data rate transmission with low transit delays over the populated areas of the Earth's surface. In a preferred embodiment, the system provides satellite services with a variety of user data rates. It also provides high data rate connections to gateway earth terminals that interface to the public switched telephone network (PSTN).

The second LEO tier provides bandwidth on a provisioned basis. Connections provided by the second LEO tier do not come and go like the bandwidth-on-demand connections of the first LEO tier. Instead, a user arranges for a constantly available wideband connection to one or more CPEs. Bandwidth is allocated on a provisioned basis and is analogous to a terrestrial trunked line.

In contrast to the first LEO tier, the second LEO tier does not incur much switching overhead. The lack of switching overhead allows more of the satellite payload resources to be used for communication bandwidth.

The constellation design for the second LEO tier consists of 72 satellites flying in planes of 6 equally-spaced satellites in 12 planar orbits. The satellites form a constellation that provides coverage over 99% of the populated earth's surface.

A LEO constellation has been selected for the implementation of the second tier to ensure that the delays experienced by end-users are essentially equivalent to domestic transport systems for global real-time services. The system has been designed to be compatible with the existing global terrestrial infrastructure and communication standards. Thus, the system will seamlessly integrate with existing networks and provide a quality of service similar to that achieved by terrestrial fiber optic based networks.

Section 4—DESCRIPTION OF SYSTEM COMPONENTS

4.A Customer Premise Equipment (CPE)

In a preferred embodiment, CPEs have capability for both Internet-type services as well as inter-active multimedia services. Further, dual antennas are desirable. A first antenna is used to receive broadcast information from GEO satellites. A second antenna is used to transmit and receive information from LEO satellites. In a preferred embodiment, CPEs have the ability to simultaneously operate in an interactive broadband mode involving traffic of the Internet-type and the reception of Direct Television (DTV) signals.

Ideally, a single CPE would be used to communicate with both GEO and LEO satellites. In an alternate embodiment, separate CPEs could be used for communications with the GEO and LEO satellite tiers, respectively.

The method and apparatus of the present invention will provides the infrastructure that will support a broad range of compatible CPE products. Here are four examples of CPE products.

Direct to Home Terminal:

The direct to home terminal is a USAT terminal designed to provide multi-media and telecommuting services to the home. This terminal receives downlinks from the GEO tier, and has duplex communications with the bandwidth-on-demand LEO tier. The direct to home terminal provides 99.5% availability with a small electronically scanned array antenna. Availability can be increased with a larger mechanically steered antenna.

Small Business Terminal:

The small business terminal is a VSAT class terminal designed to provide a variety of services for small businesses. This terminal receives downlinks from the GEO tier, and has duplex communications with the bandwidth-on-demand LEO tier. The small business terminal provides an availability of 99.9% in rain region K with a nominal 0.75 cm mechanically steered antenna. This availability can be improved with a larger antenna.

Corporate Terminal:

Provides access for enterprise networking and provisioned private lines at an OC-1 rate. The corporate terminal provides uplink and downlink services to the GEO tier and both LEO tiers. The terminal will provide 99.9% availability in rain region K with the nominal antenna size and without the use of antenna site diversity. As an option, the availability can be improved by larger antennas or site diversity.

Gateway Terminal:

Provides an interface to the PSTN. It is expected that gateway terminals will be available to connect at OC-1 rates (51.84 Mbps) and at OC-3 rates (155.54 Mbps). The gateway terminal provides uplink and downlink services to the GEO tier and both LEO tiers. By appropriately placing distributed antenna facilities, a gateway terminal can have an availability of 99.99 or greater.

All terminals use directional antennas to maintain contact with the space constellation, preferably with at least two independent antenna beams per terminal to support make-before-break hand-offs.

A variety of customer-selected options are anticipated within the basic CPE categories, depending on the end-user services being supported by the terminal. Fundamental to the CPE design, for example, are customer-specified service converters (e.g. protocol adapters) that provide access to the system in a manner that is transparent to the end-users. Other CPE options include configurations to support the asymmetric transmission rates anticipated for particular types of services, and configurations to expand a service provider's capacity beyond the specified data rates by using multiple channel frequencies.

Section 5—METHOD OF OPERATION

Figure 5:
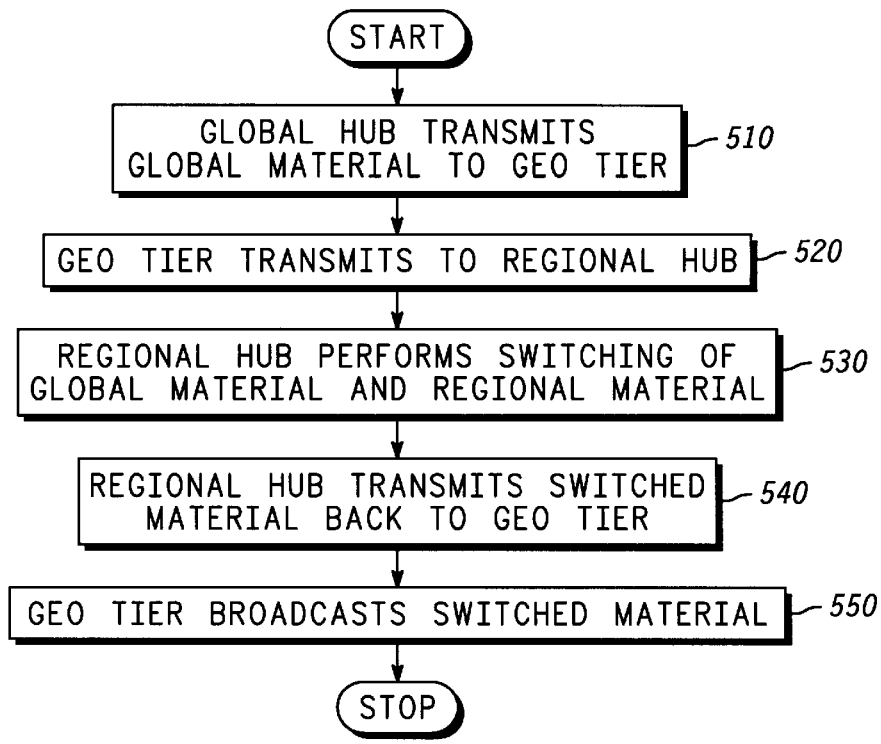
FIG. 5 shows a method of operating a two tier satellite system in accordance with an embodiment of the present invention.

FIG. 5 shows a method of operating a two tier satellite system in accordance with an embodiment of the present invention.

In step 510, the global hub transmits global program information to the GEO tier. The GEO tier is comprised of the source GEO satellite which directly receives the global program information, and possibly other regional GEO satellites. Then, in step 520, the GEO tier transmits the global program information to a regional hub.

After the global program information is at the regional hub, it is conditionally stored for later use. If the information is desired to be used at a later time, it is stored and forwarded later.

Then in step 530, the regional hub performs switching of the global program material and regional material. The regional material may also be combined with local material. After the switched material is generated, it is transmitted back to the GEOS tier in step 540, and finally the switched material is broadcast from the GEOS tier in step 550.

Figure 6:
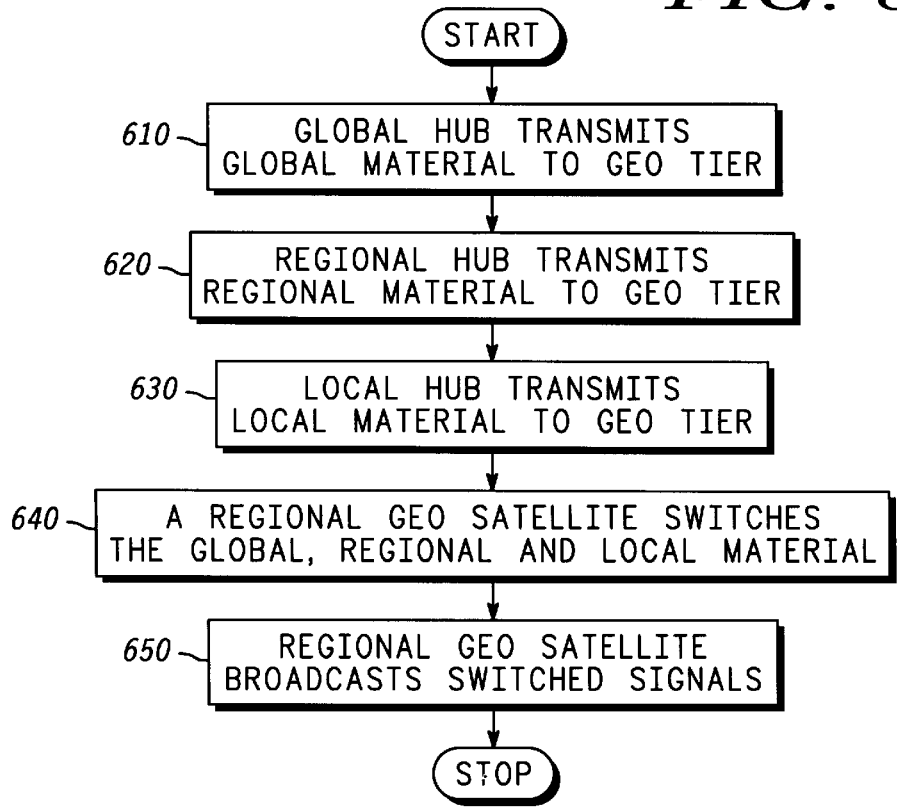
FIG. 6 shows a method of operating a two tier satellite system in accordance with an embodiment of the present invention.

FIG. 6 shows a method of operating a two tier satellite system in accordance with an embodiment of the present invention.

In step 610, the global hub transmits global program information to the GEO tier. The GEO tier is comprised of the source GEO satellite which directly receives the global program information, and possibly other regional GEO satellites. Then, in step 620, a regional hub transmits regional program information to the GEO tier.

Then, in step 630, at least one local hub transmits local program information to the GEO tier.

Then in step 640, a regional GEO satellite performs switching of the global program material, regional program material, and local program material. After the switched material is generated, it is broadcast from the GEOS tier in step 650.

Figure 7:
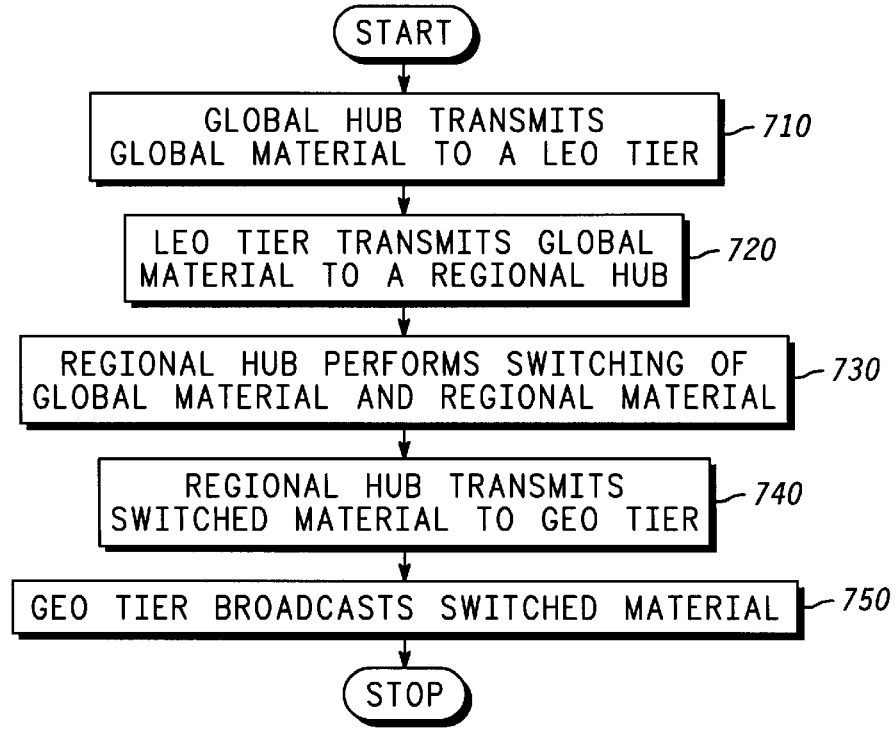
FIG. 7 shows a method of operating a two tier satellite system in accordance with an embodiment of the present invention.

FIG. 7 shows a method of operating a two tier satellite system in accordance with an embodiment of the present invention.

In step 710, the global hub transmits global program information to a LEO tier. Then, in step 720, the LEO tier transmits the global program information to a regional hub.

After the global program information is at the regional hub, it is conditionally stored for later use. If the information is desired to be used at a later time, it is stored and forwarded later.

Then in step 730, the regional hub performs switching of the global program material and regional material. The regional material may also be combined with local material. After the switched material is generated, it is transmitted to a GEOS tier in step 740, and finally the switched material is broadcast from the GEOS tier in step 750.

Figure 8:
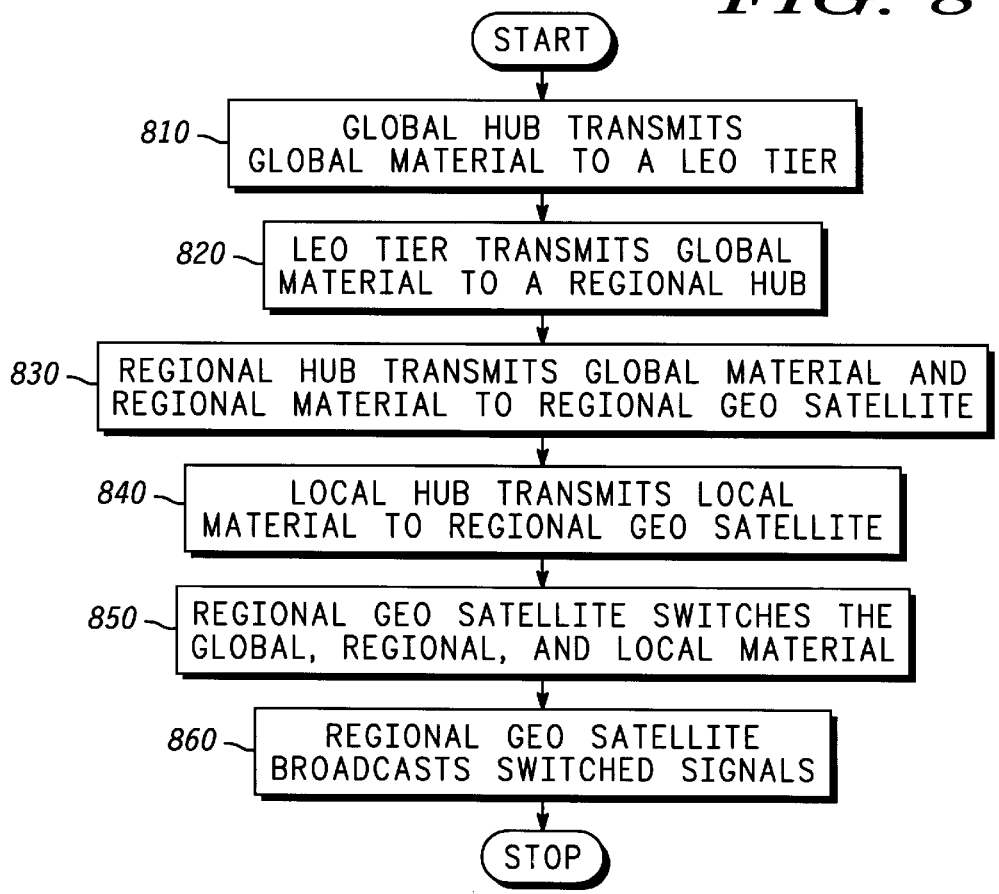
FIG. 8 shows a method of operating a two tier satellite system in accordance with an embodiment of the present invention.

FIG. 8 shows a method of operating a two tier satellite system in accordance with an embodiment of the present invention.

In step 810, the global hub transmits global program information to a LEO tier. Then, in step 820, the LEO tier transmits the global program information to a regional hub.

Then, in step 830, the regional hub transmits the global program information and regional program information to a regional GEO satellite.

Then, in step 840, at least one local hub transmits local program information to the regional GEO satellite.

Then in step 850, the regional GEO satellite performs switching of the global program material, regional program material, and local program material. After the switched material is generated, it is broadcast from the GEOS tier in step 860.

In summary, a method and apparatus have been described for combining multiple satellite constellations into a cooperative network. A GEO tier of satellites receives information to be broadcasted to earth. The GEO tier receives the information from global hubs, regional hubs, and local hubs. Local program material is combined with regional and global program material by either the regional hub or a GEO satellite.

The foregoing description of the specific embodiments will so fully reveal the general nature of the invention that others can, by applying current knowledge, readily modify or adapt for various applications such specific embodiments without departing from the generic concept and, therefore, such adaptations and modifications should and are intended to be comprehended within the meaning and range of equivalents of the disclosed embodiments. For example, the first and second LEO tiers can be combined into a single tier by combining payloads from the two tiers into a single tier.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A satellite communication system comprising:
   multiple constellations of one or more satellites each;
   at least one global hub which interoperates with the multiple constellations; and
   multiple constellations of one or more satellites each;
   at least one global hub which interoperates with the multiple constellations; and
   multiple customer premise equipment, each of which interoperates directly with one or more satellites of at least two of the multiple constellations,
   wherein the CPE solicits service from the at least one global hub via one of the multiple constellations, and
   the global hub grants the service and provides the service to the CPE via a constellation suited to provide the requested service.

2. A satellite communication system comprising:
   multiple constellations of one or more satellites each, wherein a first constellation of the multiple constellations is a low earth orbit satellite constellation suited to provide bandwidth-on-demand services;
   at least one global hub which interoperates with the multiple constellations; and
   multiple customer premise equipment, each of which interoperates with at least two of the multiple constellations,
   wherein the CPE solicits service from the at least one global hub via one of the multiple constellations, and
   the global hub grants the service and provides the service to the CPE via a constellation suited to provide the requested service.

3. The system as claimed in claim 2, wherein a second constellation of the multiple constellations is a geosynchronous satellite constellation suited to provide broadcast services.

4. The system as claimed in claim 2, wherein a second constellation of the multiple constellations is a low earth orbit satellite constellation suited to provide provisioned bandwidth services.

5. A satellite communication system comprising:
   multiple constellations of one or more satellites each, at least one global hub which interoperates with the multiple constellations; and
   multiple customer premise equipment, each of which interoperates with at least two of the multiple constellations,
   wherein a first constellation of the multiple constellations is a geosynchronous satellite constellation comprising a plurality of GEO satellites,
   a second constellation of the multiple constellations is a low earth orbit constellation comprising a plurality of LEO satellites,
   said plurality of GEO satellites and said plurality of LEO satellites share a common satellite bus,
   the CPE solicits service from the at least one global hub via one of the multiple constellations, and
   the global hub grants the service and provides the service to the CPE via a constellation suited to provide the requested service.

6. A method of operating a multi-tier satellite system comprising the steps of:
   a global hub transmitting global program information to a GEO tier;
   said GEO tier transmitting said global program information to a regional hub;
   said regional hub switching said global program information with regional program material to create switched program material;
   said regional hub transmitting said switched program material to said GEO tier; and
   said GEO tier broadcasting said switched program material.

7. The method of claim 6 wherein said regional program material comprises local program material.

8. The method of claim 6 wherein prior to the step of said regional hub transmitting said switched program material to said GEO tier, said regional hub stores said global program material for a finite period of time.

9. A method of operating a multi-tier satellite system comprising the steps of:
   a global hub transmitting global program information to a GEO tier;
   a regional hub transmitting regional program information to said GEO tier;
   a local hub transmitting local program information to said GEO tier;
   a regional GEO satellite switching said global program information with said regional program material and said local program material to create switched program material; and
   said regional GEO satellite broadcasting said switched program material.

10. A method of operating a multi-tier satellite system comprising the steps of:
    a global hub transmitting global program information to a LEO tier;
    said LEO tier transmitting said global program information to a regional hub;
    said regional hub switching said global program information with regional program material to create switched program material;
    said regional hub transmitting said switched program material to said GEO tier; and
    said GEO tier broadcasting said switched program material.

11. The method of claim 10 wherein said regional program material comprises local program material.

12. The method of claim 10 wherein prior to the step of said regional hub transmitting said switched program material to said GEO tier, said regional hub stores said global program material for a finite period of time.

13. A method of operating a multi-tier satellite system comprising the steps of:

a global hub transmitting global program information to a LEO tier;

said LEO tier transmitting said global program information to a regional hub;

said regional hub transmitting said global program information and regional program information to a GEO tier;

a local hub transmitting local program information to said GEO tier;

a regional GEO satellite switching said global program information with said regional program information and said local program information to create switched program material; and said regional GEO satellite broadcasting said switched program material.

* * * * *